United States Patent [19]

Hall et al.

[11] 4,243,704
[45] Jan. 6, 1981

[54] AUTODEPOSITION COATING PROCESS

[75] Inventors: Wilbur S. Hall, Plymouth Meeting; Harry M. Leister, Ambler, both of Pa.

[73] Assignee: Amchem Products, Inc., Ambler, Pa.

[21] Appl. No.: 878,863

[22] Filed: Feb. 17, 1978

Related U.S. Application Data

[63] Continuation-in-part of Ser. No. 608,967, Aug. 29, 1975, abandoned.

[51] Int. Cl.$^3$ .............. B05D 3/02; B05D 1/18
[52] U.S. Cl. .................. 427/327; 427/388.2; 427/388.4; 427/435
[58] Field of Search .......... 427/435, 327, 388 A, 427/388 C

[56] References Cited

U.S. PATENT DOCUMENTS 3,936,546  2/1976  Hall .................. 427/435

FOREIGN PATENT DOCUMENTS 741124  2/1974  South Africa .......... 427/435

*Primary Examiner*—Ronald H. Smith
*Assistant Examiner*—Richard Bueker
*Attorney, Agent, or Firm*—Alexis Barron

[57]  ABSTRACT

In a process wherein an organic coating is formed on a metallic surface by immersing the surface in an acidic aqueous coating composition containing dispersed particles of an organic coating-forming material from which the particles are deposited on the metallic surface forming an organic coating which increases in thickness the longer the surface is immersed in the composition and wherein the temperature of the coating composition tends to rise with the result that the quality of coatings formed therefrom is affected adversely, particularly when coating worked or roughened metal surfaces, the improvement comprising maintaining the temperature of the coating composition at a temperature within the range over which the rate of change in the rate of film build is substantially constant thereby improving the quality of the coating formed by the deposition of coating-forming particles, including reducing or preventing the tendency of the composition to form coatings which contain pinholes and/or craters.

3 Claims, No Drawings

AUTODEPOSITION COATING PROCESS

This application is a continuation-in-part of Ser. No. 608,967, filed Aug. 29, 1975, now abandoned.

FIELD OF THE INVENTION

This invention relates to the formation of organic coatings on metallic surfaces. More specifically, this invention relates to the deposition on metallic surfaces of organic coatings by contacting the metallic surfaces with an acidic aqueous coating solution containing dispersed particles of an organic coating-forming material such as resin particles.

A relatively recent development in the coating field is the provision of water-based coating compositions which are effective, without the aid of electricity, in forming on metallic surfaces immersed therein organic coatings that increase in thickness or weight the longer the time the surfaces are immersed in the compositions. (For convenience, a coating formed from such a composition is hereafter referred to as "an organic coating which grows with time" or as an "autodeposited coating".) Speaking generally, compositions which are so effective comprise acidic aqueous coating solutions having dispersed therein particles of an organic coating forming material such as resin particles. Autodeposited coatings are formed from such compositions as a result of their ability to attack and dissolve from the metallic surface metal ions in amounts which cause the particles to deposit on the surface in a manner such that there is a continuous buildup of organic coating on the surface.

Coatings formed from such compositions are distinctly different from coatings formed by immersing the metallic surfaces in conventional latices, that is, compositions comprising solid resin particles dispersed in water. The weight or thickness of a coating formed by immersing a metallic surface in a conventional latex is not influenced by the time the surface is immersed in the latex. It is in the main influenced by the amount of resin solids dispersed in the aqueous medium.

Coatings formed from the aforementioned recently developed coating compositions are also distinctly different from coatings formed from earlier known acidic aqueous coating solutions containing dispersed solid resin particles and relatively high amounts of water soluble corrosion inhibitors, such as compounds containing hexavalent chromium. The use of relatively high amounts of corrosion inhibitors in such solutions deters attack of the metallic surface to an extent such that resinous coatings which grow with time are not obtained. Thus, resinous coatings formed by immersing metallic surfaces in such compositions are like those formed from immersing the metallic surfaces in conventional latices in that they do not grow with time.

The use of the recently developed coating compositions which produce coatings which grow with time offer a number of advantages. For example, other factors being constant, they can be used to apply thicker organic coatings to the metallic surface in a shorter period of time and in a one-step operation Also, the coating thickness can be controlled by varying the immersion time of the metallic surface in the coating composition. In general, coatings which have improved corrosion resistant properties and aesthetic appearance are obtainable, and such coatings can be formed without using electricity, as is required in electrocoating. These are but a few of the advantages which flow from the use of coating compositions which function by the continuous deposition of dispersed particles producing coatings which increase in thickness during the entire period of immersion forming coatings of substantially higher solids content than the solids content of the coating solution without the aid of electricity or other externally applied force.

The aforementioned type of composition is capable of forming organic coatings of excellent quality. However, it has been observed on occasion that during use of the composition, coatings having certain defects begin to be formed. Examples of such defects are pinholes and/or craters. These defects in the coating are particularly noticeable after the resin has been fused by baking. In addition to an undesirable appearance, such defects also have an adverse effect on the corrosion resistance of the coating. Such defects are encountered for no apparent reason. Analyses of the coating bath composition prior to and after encountering such defects shows no change in the composition.

For use in some applications, such defects may be of little or no consequence. However, there are applications where coatings containing such defects would not be tolerable or at least, undesirable. Pinholes or craters in the coating generally lower its corrosion resistant properties. In applications where such properties are important, such coatings would be unsuitable. They would be unsuitable also in applications in which it is desired that the coating appearance comprises a smooth unbroken film.

The present invention relates to reducing or preventing the formation of defects in coatings formed from a coating composition of the type which forms on a metallic surface an organic coating which grows with time.

SUMMARY OF THE INVENTION

In accordance with this invention, it has been found that the quality of autodeposited coatings can be improved if the temperature of the coating process is maintained within a predetermined range. More particularly since the coating processes are usually carried out by immersing the metal surface in a coating bath it has been found that cooling the bath is necessary to avoid defective coatings under certain circumstances.

By way of background, it is noted that the aforementioned type of composition is effective in forming coatings on metallic surfaces over a wide temperature range, including temperatures approaching the boiling point of the aqueous composition and approaching a lower temperature at which the dispersed particles are undesirably coagulated. There are advantages in operating the composition at an elevated temperature. Speaking generally, the higher the temperature of the composition, the greater the thickness of the coating. Thus, at higher temperatures, the shorter the time required to produce a coating of given thickness.

It is expected that in most industrial applications, the composition will be operated at a fixed line speed and at the ambient temperature of the coating plant, i.e., the temperature of the surrounding environment. This avoids the use of energy to heat or cool the composition. In this way, good quality coatings of desired thickness have been obtained in a relatively short period of time, for example, 1–3 minutes. However, it has now been found that a coating bath operated without temperature control tends to fluctuate over a period of time and whereas the coating forming process itself does not appear to be affected, the coating quality has been affected in some instances. Temperature fluctuation depends on a variety of factors, such as: the time of year and the overall heating or air conditioning systems (if any) present in the place where the composition is located. It has been found that when the temperature of the composition rises to above about 80° F., coatings having defects tend to be formed. In general, the defects occur in coatings formed on metallic surfaces which have been worked, for example, subjected to forming, stamping, bending, drawing, shearing, drilling, punching, cutting, grinding or similar operations. The more heavily worked the surface, the more severe the defect problem.

In accordance with this invention, the tendency of forming coatings having defects is reduced or prevented by maintaining the temperature of a coating composition which tends to fluctuate in temperature, for example, by rising to above 80° F., at a temperature below 80° F., suitably below 75° F. or lower by contacting the composition, as necessary, with a medium which will absorb heat.

DETAILED DESCRIPTION OF THE INVENTION

As will be seen from examples reported below, there are autodepositing applications in which defect-free coatings are produced. However, under certain conditions, autodeposited coatings having defects are formed.

One of the factors involved in the formation of coatings having defects is the type of metal surface being treated. Coating defects have been encountered when coating metal surfaces which have been worked, for example, subjected to forming, stamping, bending drawing, shearing or similar operations. Working of the metal surface generally imparts strains or stresses to the metal and can result in scratching, scoring or galling of the surface. The more highly worked the surface, the greater the tendency for coatings formed thereon to contain defects. In general, the defects are confined to those portions of the coating that overlie the portions of the metal surface that have been worked. For example, in an application in which but a portion of the metal surface has been galled as a result of a stamping operation, defects have been observed in only those portions of the coating that overlie the gall marks; otherwise, the coating is defect-free.

Defects in autodeposited coatings have also been encountered when coating metal surfaces that are in a roughened condition for reasons other than their having been worked. Articles made by a casting operation often have roughened surfaces as a result of the rough surfaces of the walls of the mold in which the article is formed.

Defects in autodeposited coatings formed on metal surfaces of the type described above can take various forms, depending on the particular application involved. For example, the defects may show up as pinholes and/or craters.

The exact cause of these defects is not fully understood though generally it is believed to be a deficiency in resin particles deposited in specific pinpoint areas on the worked or roughened metal surface resulting in a pinhole or crater in the cured coating. A pinhole is a small hole in the coating directly through to the metal surface where no resin has deposited. Craters are areas where the coating is substantially thinner than the average coating thickness indicating little or no deposition of resin. In coating metal surfaces with worked or roughened areas, it is believed that the worked or roughened areas are more highly reactive resulting in the formation of hydrogen gas which may remain adsorbed to the metal surface. The presence of adsorbed hydrogen denies access of the resin particles to that specific area. In those cases where hydrogen remains on the surface throughout the entire coating process, the result is likely to be a pinhole. If the hydrogen escapes while the coating process is still in progress, the result will be to reduce the deposition of particles in that particular area which shows up as a crater in the cured coating. The rate at which the metal is dissolved and hydrogen generated by acid attack on the metal is a function of temperature and it may be that by reducing the temperature, the formation of hydrogen gas is prevented or substantially decreased thereby avoiding defects in the coating. There may be other explanations for the causes of pinholes and craters; however, whether due to the rapid generation of hydrogen or other factors, or a combination of factors, it has now been found that the formation of coatings substantially free of pinholes or craters can be obtained even when coating worked or roughened surfaces by controlling the temperature at which the particles are deposited on the metal surface.

In some applications, defects are not observable in the wet, unfused coating, but they appear after the coating has been fused by subjecting it to an elevated temperature. In still other applications, pinholes have been observed in the wet, unfused coating.

Process steps used in an autodepositing operation often include subjecting the wet autodeposited coating to rinse steps after the metal article has been contacted with the autodepositing composition. For example, a wet or partially dried coating can be subjected to a water rinse and/or contact with an aqueous chromium-containing solution for the purpose of improving the corrosion resistant properties of the coating. In some applications, the defects in the coating may be so severe that those portions of the coating overlying the portions of the surface that lead to the aforementioned type defects slough upon contact with the liquid rinse composition, that is, pieces of the coating are removed during the rinse treatment. In such cases, the defect appears as an uncoated portion of the metal surface.

Coating compositions which are effective in forming organic coatings which grow with time are known. Examples of such coating compositions are described in U.S. Pat. Nos. 3,585,084, 3,592,699, 3,709,743 and 3,776,848, in British Pat. No. 1,241,991, in South African Pat. No. 72/1146 and in Belgian Patent of Addition No. 811,841. The temperature at which the process is operated according to the disclosure in these patents is not critical and generally it is indicated that good results are obtained at temperatures between about 20° C. and about 40° C. or the corresponding 68° F. and 104° F.

Speaking generally, the acidic aqueous coating compositions of the aforementioned type function to attack and dissolve from a metallic surface contacted therewith metal ions in an amount sufficient to directly or indirectly cause organic particles in the region of the metallic surface to deposit thereon in a continuous fashion, that is, in a manner such that there is a build-up in the amount of organic material deposited on the surface the longer the time the surface is in contact with the composition. This deposition of the organic material on the metallic surface is achieved through chemical action of the coating composition on the metallic surface. The use of electricity which is necessary for the operation of some coating methods, such as the electrocoating method, is not required.

It is believed that the present invention will be used most widely in connection with coatings formed from compositions that contain solid particles of resin dispersed in the aqueous phase of the composition. A preferred composition for use in the practice of the present invention is described in U.S. patent application Ser. No. 562,898, filed Mar. 27, 1975, now abandoned in the name of Wilbur S. Hall, an applicant herein, and incorporated by reference. The operating temperature range employed in the process of said copending application is indicated as open, with coating thickness depending on temperature. At about 35° F. a coating of 0.8 mils is obtained while at about 100° F., a coating of 1.1 mil is formed. British Pat. No. 1,356,215 also assigned to the same assignee discloses a similar process giving an operating temperature range of about 40° F. with ambient temperature, given as 60° to 90° F., preferred. The preferred composition of copending application Ser. No. 562,898 has a pH of about 1.6 to about 4 and is prepared from water, a ferric-containing compound, most preferably ferric fluoride, in an amount such that it contains the equivalent of about 0.5 to about 3.5 g/l of ferric iron, about 0.2 to about 5 g/l of HF, a pigment such as carbon black, and about 50 to about 100 g/l of resin particles which are all of substantially the same size and substantially chemically homogeneous, that is, each particle is comprised of the same monomeric constituents present in substantially the same proportions or resin particles which are prepared by copolymerizing the following monomers:

(1) about 25 to about 70, and preferably about 40 to about 65 wt. % of a conjugated diene having, for example, 4 to about 9 carbon atoms, such as butadiene or isoprene;

(2) about 5 to about 70, and preferably about 30 to about 65 wt. % of $CH_2=CHR$, wherein R is an aryl or a cyano group, for example, styrene or acrylonitrile; p1 (3) about 1 to about 50, and preferably about 3 to about 15 wt. % of a vinyl halide such as vinyl chloride or vinylidene chloride; and (4) about 0.5 to about 15, and preferably about 1 to about 4 wt. % of a monoethylenically unsaturated monomer having a functional group selected from the class consisting of amide and carboxylic groups, such as acrylamide, methacrylamide, octyl acid maleate and monoethylenically unsaturated monocarboxylic and dicarboxylic acids having about 3 to about 12 carbon atoms, and preferably about 3 to about 5 carbon atoms, such as, for example: acrylic acid; cinnamic acid; methacrylic acid; crotonic acid; itaconic acid; maleic acid; and fumaric acid.

The resin is used most conveniently in the form of a latex which can be prepared according to available techniques.

A particularly preferred latex contains particles of resin prepared from the aforementioned monomers, which particles are chemically and physically homogeneous. The resin particles of the preferred latex are prepared from styrene, butadiene, vinylidene chloride and methacrylic acid. In addition, the emulsifier content of the preferred latex is about 1 to about 4% based on the resin solids and comprises at least 90 wt %, most preferably 100 wt. % of an anionic emulsifier such as a sulfonate, for example, sodium dodecylbenzene sulfonate, or a sulfosuccinate, for example, sodium oleoyl isopropanolamide sulfosuccinate, or a mixture thereof.

A highly preferred autodepositing composition has a surfactant concentration as described above and a pH within the range of about 2 to about 3.2 and comprises about 50 to about 125 g/l of resin solids, ferric fluoride, in an amount equivalent to about 0.5 to about 2 g/l of ferric iron, and about 0.7 to about 3 g/l of HF.

As mentioned above, the longer the metallic surface is immersed in the coating composition, the greater the buildup in coating thickness. It is believed that for most applications, desired coating thicknesses can be obtained by immersing the metallic surface in the composition for a period of time within the range of about 30 seconds to about 3 minutes. In a preferred embodiment coating thicknesses of about 1 mil are obtained in a 90 second treatment time. However, it should be understood that longer or shorter periods of time can be used.

In operation, utilizing coating compositions of the type described above, it has been found that when all other parameters except temperature are kept constant, the coating thickness increases with increased temperature. However, the rate of increase in coating thickness is not constant over the entire workable temperature range. A plot of the rate of change of film thickness versus temperature at a given immersion time produces a curve with three distinct slopes over the temperature range from just above freezing to above about 100° F. At low temperatures (40° F. and below) the rate of change is very low. At high temperatures (80° F. and above) the activity becomes excessive and the coatings show pinholes. In the intermediate temperature range, the rate of change of film thickness is nearly constant and produces films of good uniformity without pinholes or craters. This temperature mid range may be different depending upon other coating composition parameters such as solids concentration, pH, redox potential and others, but there is a substantial range covering in excess of 10° on the Fahrenheit scale and generally in excess of 20° and as high as 30° or more where increases in temperature produce corresponding increases in coating thickness at a uniform rate, i.e., no sharp deviation. However, at about 80° F. the rate of increase in coating thickness becomes substantially greater as the temperature is increased above 80° F. Thus, in the preferred composition utilizing a styrene butadiene latex pigment composition prepared from a latex available from W. R. Grace Company under the brand name Darex, combined with 5 g/liter of carbon pigment dispersion available from Borden Chemical Co. as Aquablak 115, at a solids concentration of about 10.13% by weight, HF at 2.1 grams per liter and $FeF_3$ at 3.0 grams per liter, it has been found that in a coating bath having a redox potential of 295 millivolts coatings of about 1 mil thickness are formed in 90 seconds at room temperature (65° to 70° F.). So long as the other conditions are maintained, coatings of about 1 mil (±0.1 mil) are obtained in 90 seconds over a temperature mid range of between about 50° F. and about 70° F. It has also been found that coating defects such as pinholes and craters are not produced when coating worked or roughened metal surfaces so long as the coating is carried out at a temperature within this mid-range where the amount of film build obtained in a given period increases in substantially direct proportion to the increase in temperature. Thus, the high and low temperature of the mid-range can be determined by plotting temperature versus increase in coating weight or film thickness for incremental increases in temperature. The rate of increase of film build is substantially constant over the mid range. However, outside the mid range particularly at the upper end the rate of increase in film build changes significantly.

With respect to worked metallic surfaces, including surfaces that are scored or scratched, and which are to be coated with compositions of the type described, the temperature of the composition should be maintained in the mid-range which generally can be achieved by maintaining the temperature of the coating bath below about 75° F. As pointed out above, however, the temperature at which any given composition will tend to form coatings having defects on such surfaces will tend to vary depending on various factors. For example, the more heavily worked the metal part, the more severe the problem, and the lower the temperature at which defects in the coating may occur. Also, the more active the coating composition, the more severe the problem. The activity of the composition refers to the extent to which it attacks and dissolves metal from the metallic surface. Though other conditions also determine the activity of the preferred composition, pH is a major factor and it has been found that increasing the pH has a beneficial effect in reducing the tendency to form pinholes or craters. Generally, the pH cannot be raised above about 3.3 without harming the coating ability of the composition. In view of the various factors that have an influence on the formation of coatings having defects and the severity of the defects, experience with a specific coating operation should be used in determining the mid range temperature range. To eliminate or reduce the formation of pinholes and craters the bath should be maintained at a temperature below the upper limit of the mid range as described above. The mid range can be determined for any specific coating operation by treating test panels at varying temperatures and measuring the coating thickness developed in a given time.

It is believed that overall good and consistent results can be achieved for most autodepositing compositions by maintaining the temperature of the coating composition within a preferred range of about 65° to about 75° F.

In a situation where the location of the coating plant is such that the temperature of the composition is apt to fall below normal room temperature and to a temperature which would coagulate the dispersed particles of organic coating-forming material, the heat exchange apparatus used in maintaining the temperature of the composition below that at which defects in the coating are encountered can be used to heat the composition in order to maintain the temperature of the composition in the range where there is no tendency for the composition to destabilize through particle coagulation.

Where the autodepositing process is carried out in an environment which causes the temperature to rise above about 80° F. cooling is required for best coating quality particularly when coating worked or roughened surfaces. The coating process itself and the reactions occurring during deposition of resin particles from the coating composition produce no appreciable exotherm. Increase in bath temperature may be caused by several external factors such as latent heat in the work pieces but the major source of heat is the atmosphere in the area of the coating bath. Where the ambient temperature of the surrounding atmosphere is such that the bath temperature rises above about 80° F. the temperature can be reduced by cooling the surrounding atmosphere such as by air-conditioning or the bath can be cooled. In cooling the bath it is preferred to circulate a coolant such as chilled water, refrigerated brine or organic coolants through a heat exchanger immersed in the bath or surrounding the bath so as to avoid thermal shock to the bath.

Any suitable means can be used to contact the coating composition with a heat exchange medium. For example, tubes through which water is circulated can be immersed in the composition or the container holding the composition can be jacketed with tubes through which an appropriate heat exchange material is pumped. If the first mentioned method is used, it is recommended that metal tubes be coated with rubber or other material which is not reactive with the composition.

In an application where the ambient temperature is such that the temperature of the coating composition is within the desired range for certain periods of time, but tends to fluctuate due to changes in the ambient temperature, appropriate thermostatic controls can be used to circulate the heat exchange medium only as required to maintain the temperature of the composition constantly within the desired range. For example, if the ambient temperature and the temperature of the composition are at 70° F., circulation of the heat exchange medium would be unnecessary. However, if the ambient temperature tends to rise, for example, to 85°-90° F., with the result that the temperature of the composition tends to rise, a thermostat can be used to trigger circulation of cool water in contact with the composition to maintain its temperature within the desired range.

Although the coating composition can be contacted with the metal surface in a variety of ways, including, for example, by spraying and flow coating, it is believed that the most widely used method of contact will comprise immersing the metal surface in the coating composition at about room temperature. As mentioned above, the longer the metal surface is immersed in the coating composition, the greater the build-up in coating thickness. It is believed that for most applications, desired coating thicknesses can be obtained by immersing the metal surface in the composition for a period of time within the range of about 30 second to about 3 minutes. However, it should be understood that longer or shorter periods of time can be used.

Agitating the composition aids in maintaining it uniform. Also, agitation of the composition while coating can assist in improving the uniformity of the coating formed.

Various factors should be taken into account in determining whether the metal surface should or should not be cleaned and the extent of cleaning, prior to contact with the autodepositing composition, including, for example, the nature of foreign materials (if any) on the surface and the desired quality of the coating. Foreign materials which are present on the metal surface can lead to the formation of coatings which are not uniform. Also, the adhesion and corrosion resistant properties of the resinous coatings can be affected adversely as a result of the presence on the metal surface of foreign materials during the coating step. Generally speaking, improved quality coatings can be consistently obtained the cleaner the surface. Excellent results can be achieved consistently by subjecting the metal surface to a cleaning operation which results in a surface on which there can be formed a water-break-free film. The selection of the cleaning agent and mode of application thereof to the metal surface will depend on the type of foreign materials present on the metal surface. Available cleaning agents can be used in accordance with known technology. Thus, depending on the type of soil or foreign materials which are present, acidic, alkaline or other cleaning agents can be used. By way of example, dilute phosphoric acid can be used to clean lightly rusted parts and hot alkaline compositions can be used for the removal of oils, greases, fingerprints and other organic deposits.

After contact with the coating composition as described above, the coated metallic surface can be subjected to further processing steps as are known. Such steps are described briefly hereafter.

Water rinsing the coated surface after it has been withdrawn from the composition, and before significant drying takes place is effective in removing therefrom residuals such as acid and other ingredients of the bath that adhere to the coated surface. If such residuals are allowed to remain on the coated surface, they may change or adversely affect the quality of the coating. For a specific application, a determination can be made as to whether the residuals cause adverse effects which are not tolerable. If they do, they should be removed, for example, by water rinsing with tap or deionized water. If they do not, this step of removing them can be avoided.

If desired, the corrosion resistant properties of the coated surface can be improved by contacting the coated surface with an acidic aqueous rinse solution containing hexavalent chromium. Such rinse solutions can be prepared from chromium trioxide or a water soluble dichromate or chromate salt, for example, ammonium, sodium and potassium salts. There can also be used a chromium composition obtained by treating a concentrated aqueous solution of chromic acid with formaldehyde to reduce a portion of the hexavalent chromium. This type of rinse composition, which is described in U.S. Pat. No. 3,063,877 to Schiffman, contains chromium in its hexavalent state and reduced chromium in aqueous solution. It has been reported also that the water and salt spray resistance of a fused resinous coating can be improved by contacting the unfused coating with a solution, preferably an aqueous solution, of phosphoric acid (see U.S. Pat. No. 3,647,567). The recommended amount of phsophoric acid in the solution is about 0.25 to about 7 wt. % based on the total weight of the solution.

Following any rinse steps employed after the coated surface is withdrawn from the composition, the coating should be dried. Fusion of the resinous coating renders it continuous, thereby improving its resistance to corrosion and adherence to the underlying metallic surface.

The conditions under which the drying and/or fusion operation is carried out depend somewhat upon the type of resin employed. In general, heat will be required to fuse the resin. The corrosion resistant properties of coatings fused at elevated temperature have been observed to be better than coatings which have been air dried. However, there are applications where air dried coatings can be used satisfactorily. The fusion of the coating should be carried out below temperatures which cause the resinous coating to degrade. Exemplary conditions used in fusing coatings produced according to the present invention are temperatures within the range of about 100° to about 200° C. for periods of time within the range of about 10 to about 30 minutes, depending on the mass of the coated part. Baking the coating for a period of time until the metallic surface has reached the temperature of the heated environment has been used effectively.

EXAMPLES

Unless stated otherwise, the metallic parts used in the work described below are steel headlight mounting rings made by stamping, and "%" means percent by weight based on the total weight of the stated composition.

The following acidic aqueous coating composition is prepared by combining

| Ingredients | Amounts, in Pounds |
| --- | --- |
| latex containing about 54% solids | 154 |
| ferric fluoride | 2.5 |
| hydrofluoric acid | 1.9 |
| black pigment dispersion | 4.2 |
| water | to make 100 gallons |

The resin of the latex in the above composition comprises about 62% styrene, about 30% butadiene, about 5% vinylidene chloride and about 3% methacrylic acid. A film formed from the resin is soluble in refluxing chlorobenzene to the extent of about 13%. That the resin is cross-linked is indicated by its insolubility in Soxhlet extraction with chlorobenzene. The water soluble content of the latex is about 2% based on the weight of dried resin, with the water soluble content comprising about 10% sodium phosphate, about 13% sodium oleoyl isopropanolamide sulfosuccinate and about 75% sodium dodecylbenzene sulfonate, the first mentioned ingredient being a buffering agent used in preparing the latex, and the last 2 mentioned ingredients being emulsifiers. The pH of the latex is about 7.8 and the surface tension thereof about 45–50 dynes/cm. The average particle size of the resin is about 2,000 A.

The black pigment dispersion in the above composition is an aqueous dispersion having a total solids content of about 36%. Carbon black comprises about 30% of the dispersion. It has a pH of about 10–11.5 and a specific gravity of about 1.17. The dispersion contains a nonionic dispersing agent for the solids, and is sold under the trademark Aquablak 115.

Steel tubes, with inlet and outlet outside the bath, lined on the outside with rubber are hung from one of the interior sides of the container holding the above composition. Water having a temperature of about 50°–55° F. is pumped through the tubes. The temperature of the coating composition is maintained at about 70° F. notwithstanding that the ambient temperature is about 95° F. The composition is agitated.

EXAMPLE NO. 1

A mounting ring is immersed in the composition for 90 seconds. After withdrawal from the composition, the mounting ring is rinsed promptly by immersion in water and thereafter immersed for 30 seconds in a solution of about 9 g/l of $Na_2Cr_2O_27.2H_2O$. Thereafter, the mounting ring is baked for 10 minutes in an oven at 170° C. Examination of the fused coating shows the absence of pinholes or other surface defects.

COMPARATIVE EXAMPLE

A mounting ring is subjected to the same coating steps as described in Example 1 above except water is not pumped through the tubes and the temperature of the composition is allowed to rise to about 90° F. When the mounting ring is withdrawn from the composition, many pinholes are observed. After baking the coating, hundreds of pinholes are observed in the fused coating.

EXAMPLE NO. 2

The composition of the comparative example is cooled to 70° F. and a mounting ring is coated according to the procedure described in Example No. 1. Examination of the fused coating shows the absence of pinholes or other surface defects.

EXAMPLE 3

A coating composition prepared as in Example 1 was made up to a bath composition having:
5 g/l Aquablak 115
190 g/l latex (Darex 637)
3.0 g/l $FeF_3$
2.1 g/l HF
DI(deionized) water to make 1 liter Cold rolled unpolished steel panels measuring 3"×4"×0.032" were treated in the following sequence at which the coating bath temperature varied in ten degree increments between 40° F. and 90° F.

| Cleaning | 2 min. @ 160° F. using an alkaline cleaner available from Amchem Products, Inc. under the brand name Ridoline 1727 |
| --- | --- |
| Rinse | 30 seconds at room temperature using tap water |
| Rinse | 10 seconds at room temperature using D.I. water |
| Coating | 90 seconds at room temperature |
| Cure | 10 minutes at 160° C. |

The panels were weighed before and after coating and coating weights determined for each panel as a measure of film build. The film thickness was measured using a Permascope The change in film build as bath temperature was varied was determined for each ten degree increment and is shown in the tables below as change in film build.

TABLE I

| Temperature (°F.) | Weight Gain (gm) | Change In Film Build (gm) |
| --- | --- | --- |
| 40 | 0.4998 | |
| | | .0337 |
| 50 | 0.5335 | |
| | | .0833 |
| 60 | 0.6168 | |
| | | .0610 |
| 70 | 0.6778 | |
| | | .0478 |
| 80 | 0.7256 | |
| | | .1165 |
| 90 | 0.8421 | |

These results illustrate that whereas the rate of change in film build with change in temperature is substantially constant over the mid range between about 50° F. and about 80° F. the rate of change is considerably less for ten degree changes below 50° F. and considerably higher for ten degree increments above about 80° F.

TABLE II

| Temperature (°F.) | Film Thickness (mils) | Change in Film Thickness (mils) |
| --- | --- | --- |
| 40 | .87 | |
| | | .03 |
| 50 | .9 | |
| | | .15 |
| 60 | 1.05 | |
| | | .10 |
| 70 | 1.15 | |
| | | .15 |
| 80 | 1.3 | |
| | | .25 |
| 90 | 1.55 | |

The measured film thickness again shows a mid range between about 50° F. and about 80° F. within which incremental changes in temperature produce substantially the same change in film build whereas the change in film build increases substantially more above about 80° F. The preferred range between about 55° F. and about 75° F. appears to have the least change in film build with change in temperature.

EXAMPLE 4

Steel panels were treated as in Example 3 except that the treatment sequence included a 60 second air dry and a reaction rince (partially reduced chromium plus soluble $NaCr_2O_7.2H_2O$ at room temperature for 30 seconds) between the coating and cure steps. The results are shown in Tables III and IV below.

TABLE III

| Temperature (°F.) | Weight Gain (gm) | Change in Film Build |
| --- | --- | --- |
| 40 | .5033 | |
| | | .2148 |
| 50 | .5391 | |
| | | .3858 |
| 60 | .6034 | |
| | | .2892 |
| 70 | .6516 | |
| | | .3654 |
| 80 | .7125 | |
| | | .3936 |
| 90 | .7781 | |

TABLE IV

| Temperature (°F.) | Film Thickness (mils) | Change in Film Thickness (mils) |
| --- | --- | --- |
| 40 | .9 | |
| | | .08 |
| 50 | .98 | |
| | | .07 |
| 60 | 1.05 | |
| | | .05 |
| 70 | 1.1 | |
| | | .2 |
| 80 | 1.3 | |
| | | .1 |
| 90 | 1.4 | |

The above examples illustrate the effectiveness of the present invention. The present invention can be used in the coating of ferriferous surfaces other than steel, exemplified above, and also other metallic surfaces such as, for example, aluminum and zinc.

We claim:
1. In an autodepositing coating process wherein an acidic aqueous solution having coating forming organic resin particles dispersed therein is applied to a worked or roughened ferrous metal surface by immersing said surface in a coating bath containing said solution to produce on the surface a coating which increases in thickness during the time the surface is immersed in the solution, the rate at which the coating increases in thickness being greater at high temperatures, and wherein the coating is fused to form a film having surface defects including pinholes and craters; the improvement comprising carrying out the coating process by maintaining the temperature between about 65° F. and about 75° F. by cooling the coating composition by means of a heat exchanger immersed in the bath or surrounding the bath only at times when the temperature has a tendency to rise thereby to eliminate pinholes and craters in the fused coating.

2. The coating process of claim 1 wherein the coating composition comprises ferric fluoride, hydrofluoric acid, a pigment and a styrene butadiene latex.

3. The coating process of claim 1 wherein the coating composition contains the equivalent of about 0.5 to about 3.5 g/l of ferric iron, about 0.2 to about 5.0 g/l of hydrofluoric acid, about 5.0 g/l of a carbon black pigment dispersion and about 50 to about 100 g/l of resin particles added as a latex containing particles of resin prepared by copolymerizing butadiene, styrene, a vinyl halide and an acrylic acid.

* * * * *